(12) United States Patent
Suzuki et al.

(10) Patent No.: US 7,964,318 B2
(45) Date of Patent: Jun. 21, 2011

(54) COOLANT MANIFOLD AND METHODS FOR SUPPLYING AND DISCHARGING COOLANT

(75) Inventors: Masaharu Suzuki, Saitama (JP); Hideaki Kikuchi, Saitama (JP); Katsuhiko Kohyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1140 days.

(21) Appl. No.: 11/714,941

(22) Filed: Mar. 7, 2007

(65) Prior Publication Data
US 2007/0218332 A1    Sep. 20, 2007

(30) Foreign Application Priority Data

Mar. 7, 2006   (JP) .................................. 2006-060595
Dec. 25, 2006   (JP) .................................. 2006-347573

(51) Int. Cl.
*H01M 8/24*      (2006.01)
(52) U.S. Cl. ........................................ 429/459; 429/458
(58) Field of Classification Search ........................ None
See application file for complete search history.

(56) References Cited

U.S. PATENT DOCUMENTS

| 4,508,793 | A | * | 4/1985 | Kumata et al. | ............... | 429/439 |
| 4,706,737 | A | * | 11/1987 | Taylor et al. | ................... | 165/47 |
| 6,329,093 | B1 | * | 12/2001 | Ohara et al. | ................... | 429/437 |
| 6,679,280 | B1 | * | 1/2004 | Pinto | ................................ | 137/14 |

FOREIGN PATENT DOCUMENTS

| DE | 10007766 A1 | 8/2001 |
| DE | 10112074 A1 | 10/2002 |
| EP | 1038575 A2 | 9/2000 |
| JP | 2000-164238 | 6/2000 |
| JP | 2005-005196 | 1/2005 |

OTHER PUBLICATIONS

German Office Action for Application No. 10 2007 011 152.7-45, dated May 14, 2010.

* cited by examiner

*Primary Examiner* — Cynthia Lee
(74) *Attorney, Agent, or Firm* — Nelson Mullins Riley & Scarborough LLP; Anthony A. Laurentano

(57) ABSTRACT

There is provided a coolant manifold that is installed to a fuel cell stack so as to distribute coolant through the fuel cell stack, which is constituted by stacking a plurality of unit cells and has more than one communication holes for coolant supply and at least one communication hole for coolant discharge, in which the coolant flows in an order from the communication holes for coolant supply through a plurality of the unit cells to the communication hole for coolant discharge. The coolant manifold includes a manifold body having a manifold chamber that extends along an alignment direction of the communication holes for coolant supply, and an external communication part having an external communication hole for communicating the manifold chamber with external. A center axis of the external communication hole is placed unparallel and non-vertical relative to a center axis of each communication hole for coolant supply.

17 Claims, 18 Drawing Sheets

⟨CROSS-SECTIONAL VIEW ALONG Y2-Y2⟩

⟨CROSS-SECTIONAL VIEW ALONG Y3-Y3⟩

COOLANT MANIFOLD AND METHODS FOR SUPPLYING AND DISCHARGING COOLANT

CROSS-REFERENCE TO RELATED APPLICATION

This application claims the foreign priority benefit under 35 U.S.C. §119 of Japanese Patent Application No. 2006-060595 filed on Mar. 7, 2006, and Japanese Patent Application No. 2006-347573 filed on Dec. 25, 2006, the disclosures of which are incorporated herein by reference.

BACKGROUND OF THE INVENTION

1. Field of the Invention

The present invention relates to a coolant manifold that is installed to a fuel cell stack and serves for distributing or collecting coolant, and also to a method for supplying and discharging coolant.

2. Description of the Related Art

A fuel cell stack constituted of a plurality of stacked unit cells such as a polymer electrolyte fuel cell (PEFC) causes heat generation when generating electric power.

To counter this problem, as disclosed in JPA 2000-164238 (see FIGS. 1, 4) and JPA 2005-005196 (see FIGS. 1, 2), there have been provided techniques to cool a fuel cell by circulating a coolant such as radiator liquid mainly including ethylene glycol through the fuel cell stack so as to prevent an excessive temperature increase and maintain a desired temperature for power generation.

Cooling techniques to realize more efficient cooling for a fuel cell stack has been desired, and it would be desirable to provide a coolant manifold that is installed to a fuel cell stack, thereby to efficiently cool the fuel cell stack, as well as a method for supplying and discharging coolant using this coolant manifold.

SUMMARY OF THE INVENTION

In one aspect of the present invention, there is provided a coolant manifold that is installed to a fuel cell stack so as to distribute coolant through the fuel cell stack, which is constituted by a plurality of stacked unit cells and has more than one communication hole for coolant supply and at least one communication hole for coolant discharge, in which the coolant flows in an order from the communication holes for coolant supply through a plurality of the unit cells to the communication hole for coolant discharge. The coolant manifold distributes the coolant into the communication holes for coolant supply. The coolant manifold includes a manifold body having a manifold chamber that extends along an alignment direction of the communication holes for coolant supply; and an external communication part having an external communication hole for communicating the manifold chamber with external, and a center axis of the external communication hole is placed unparallel and non-vertical relative to a center axis of each communication hole for coolant supply.

In another aspect of the present invention, there is provided a coolant manifold that is installed to a fuel cell stack so as to collect coolant through the fuel cell stack, which is constituted by a plurality of stacked unit cells and has at least one communication hole for coolant supply and more than one communication hole for coolant discharge, in which the coolant flows in an order from the communication holes for coolant supply through a plurality of the unit cells to the communication hole for coolant discharge. The coolant manifold collects the coolant flowing from the communication holes for coolant discharge. The coolant manifold includes a manifold body having a manifold chamber extending along an alignment direction of the communication holes for coolant discharge; and an external communication part having an external communication hole for communicating the manifold chamber with external. A center axis of the external communication hole is placed unparallel and non-vertical relative to a center axis of each communication hole for coolant discharge.

In another aspect of the present invention, there is provided a method for supplying coolant for a fuel cell stack, which is constituted by a plurality of stacked unit cells and has more than one communication hole for coolant supply and at least one communication hole for coolant discharge, in which the coolant flows in an order from the communication holes for coolant supply through a plurality of the unit cells to the communication hole for coolant discharge. The method for supplying coolant includes distributing the coolant from an external communication hole into the communication holes for coolant supply via a manifold chamber that extends along an alignment direction of the communication holes for coolant supply; and while generating swirling flow of the coolant in the manifold chamber, supplying the coolant into the communication holes for coolant supply.

In another aspect of the present invention, there is provided a method for discharging coolant of a fuel cell stack, which is constituted by a plurality of stacked unit cells and has at least one communication hole for coolant supply and more than one communication hole for coolant discharge, in which the coolant flows in an order from the communication holes for coolant supply through a plurality of the unit cells to the communication hole for coolant discharge. The method for discharging coolant includes collecting the coolant flowing from the communication holes for coolant discharge in the manifold chamber that extends along an alignment direction of the communication holes for coolant discharge; and while generating swirling flow of the coolant in the manifold chamber, discharging the coolant into an external communication hole.

Other features and advantages of the present invention will become more apparent from the following detailed description of the invention when taken in conjunction with the accompanying exemplary drawings.

DETAILED DESCRIPTION OF THE PREFERRED EMBODIMENTS

First Embodiment

Descriptions will be provided on the first embodiment of the present invention hereinafter, with reference to FIGS. 1 to 12.

Explanations will be provided on a fuel cell stack to which the coolant manifold according to the first embodiment is installed, a fuel cell system including this fuel cell stack and a fuel cell vehicle equipped with this fuel cell system.

Figure 1:
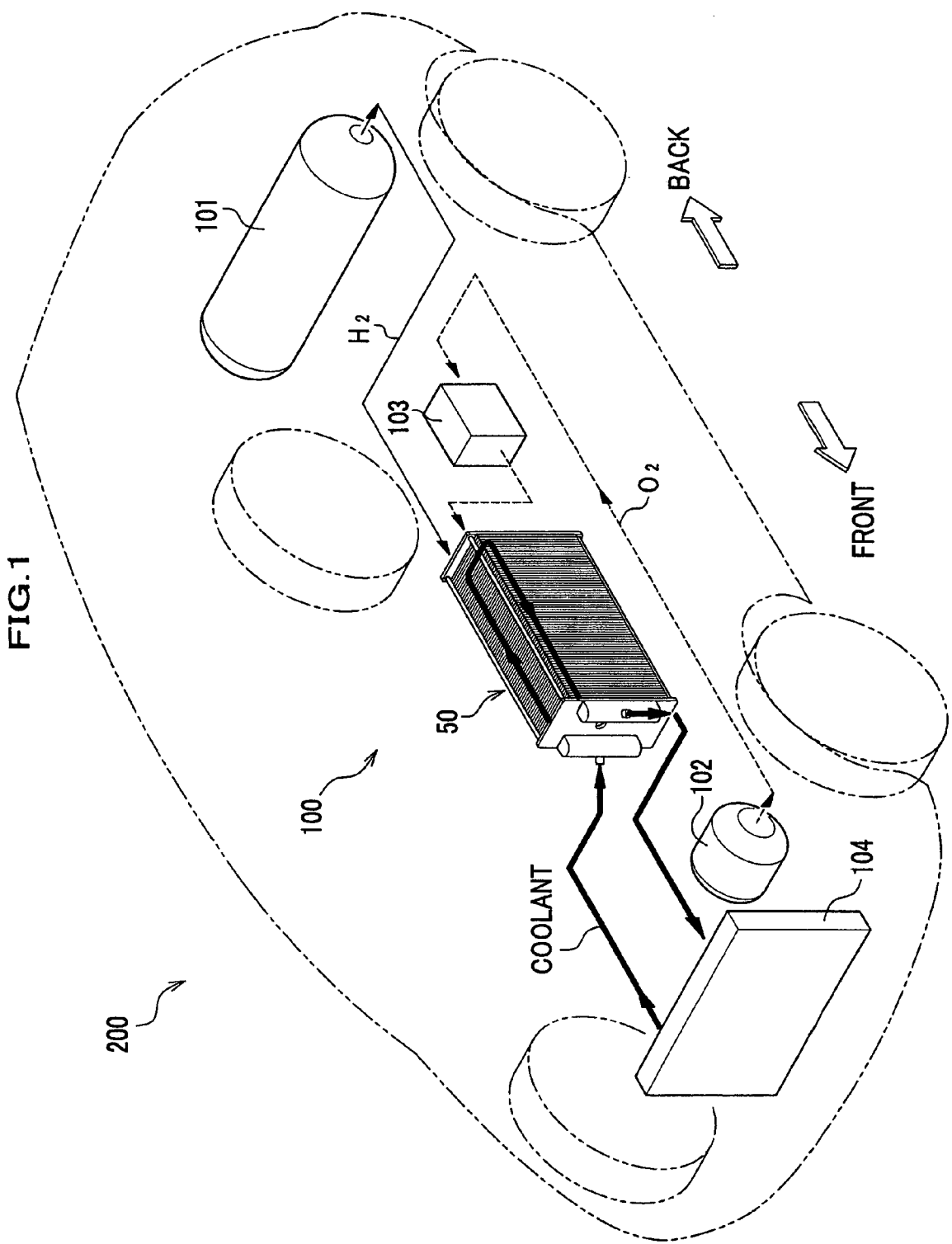
FIG. 1 is a perspective view of a fuel cell vehicle according to a first embodiment.

As shown in FIG. 1, a fuel cell vehicle 200 is equipped with a fuel cell system 100. The fuel cell system 100 includes a fuel cell stack 50, a hydrogen tank 101, a compressor 102, a humidifier 103 and a radiator 104. The fuel cell stack 50 is connected at an output terminal thereof with the an electric traction motor (not shown in the drawings) via a contactor or a voltage boosting/step-down circuit such as a DC-DC converter and the like, and the motor is driven by electric power generated by the fuel cell stack 50, and then the motive power generated by the traction motor drives fuel cell vehicle 200.

The fuel cell stack 50 and the humidifier 103 are installed within a center tunnel under a floor panel of the fuel cell vehicle 200, and are fixed to sub-frames of cross members and the like, thereby to realize a low-floor of the fuel cell vehicle 200. Hydrogen is supplied from the hydrogen tank 101 laterally provided in the back of the fuel cell vehicle 200 to the back side of the fuel cell stack 50. Air of the atmosphere including oxygen is supplied to the humidifier 103 by the compressor 102 that is placed under a bonnet, where air of the atmosphere including oxygen is humidified and then is supplied to the back side of the fuel cell stack 50.

The coolant is circulated by a pump (not shown in the drawings) and the like between the radiator 104 mounted on the back of a front grill of the fuel cell vehicle 200 and the fuel cell stack 50. The circulation of the coolant cools the fuel cell stack 50 which is self-heated when generating electric power at a desirable temperature, which contributes to maintaining the fuel cell stack 50 at a desirable temperature (for example, 70 to 80° C.).

<Fuel Cell Stack>

Detailed descriptions will be given on the fuel cell stack 50.

Figure 2:
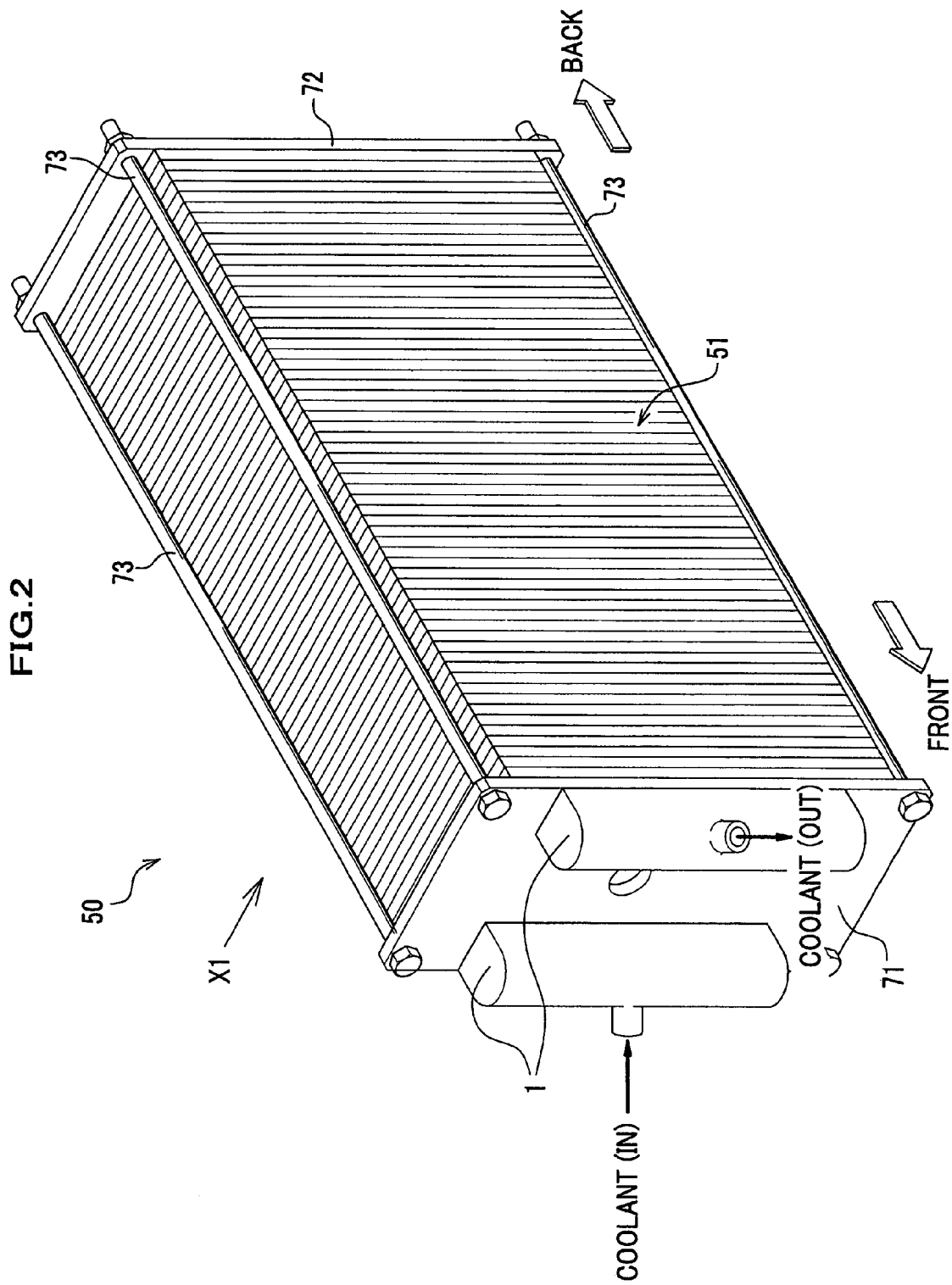
FIG. 2 is a perspective view of a fuel cell stack according to the first embodiment.
Figure 3:
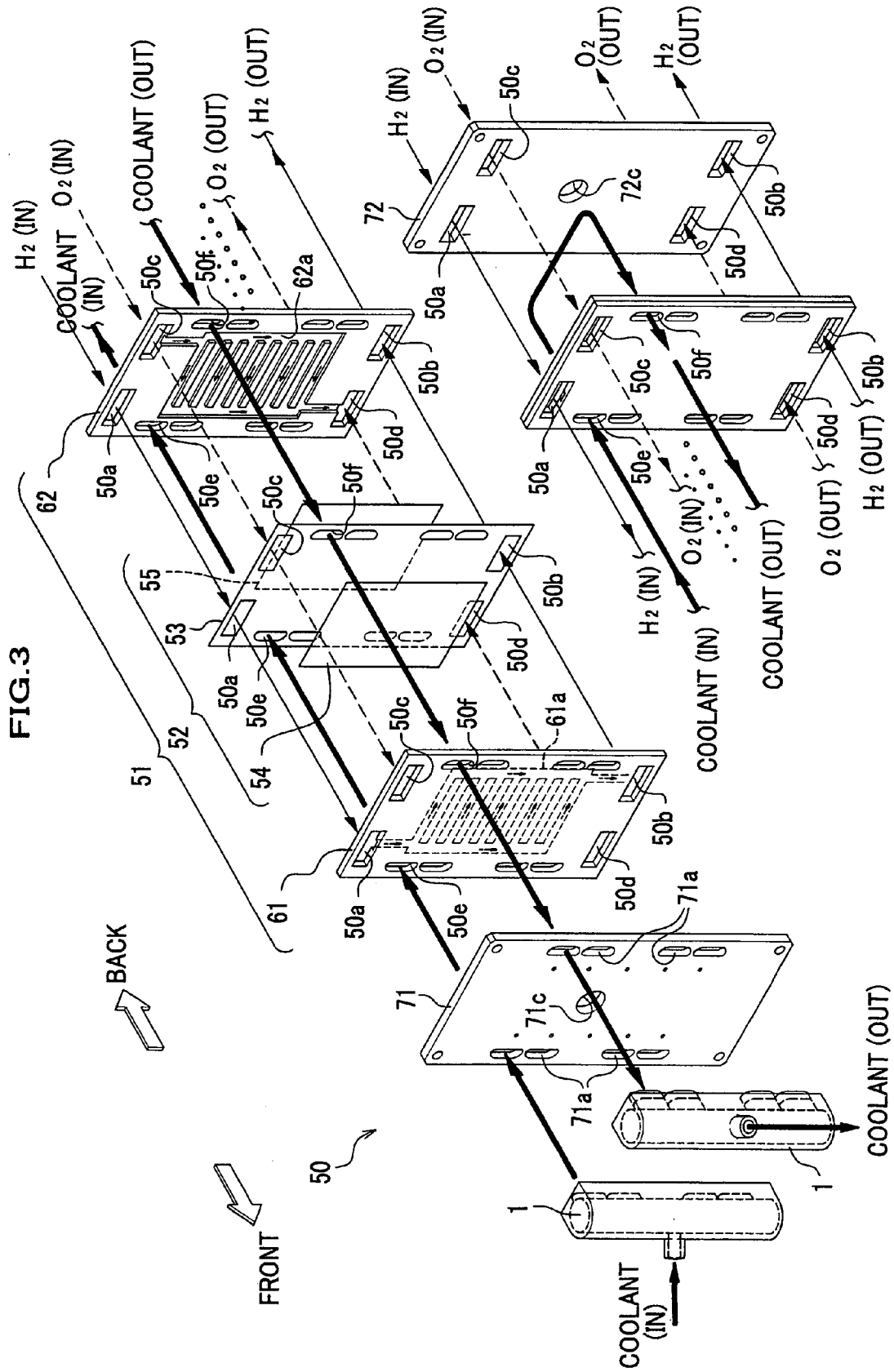
FIG. 3 is an exploded perspective view of the fuel cell stack according to the first embodiment.

As shown in FIG. 2, the fuel cell stack 50 has an approximately rectangular parallelepiped figure. As shown in FIG. 3, the fuel cell stack 50 chiefly includes a plurality of unit cells 51 (for example, 200 to 400 cells) and a high-rigidity front plate 71 and a rear plate 72. The plurality of unit cells 51 are stacked in a thickness direction thereof, and sandwiched between the front plate 71 and the rear plate 72. The front plate 71 and the rear plate 72 are fastened by long bolts 73, whereby a stable stack state of the unit cells 51 is maintained. The direction of stacking the cells 51 agrees with the longitudinal direction (traveling direction) of the fuel cell vehicle 200. The fuel cell stack 50 has a long rectangular shape in a front elevational view, when viewed from the front side to the rear side of the vehicle 200.

As shown in FIG. 3, each unit cell 51 chiefly includes MEA (Membrane Electrode Assembly) 52 and a plate-like anode separator 61 and cathode separator 62, both of which sandwich the cell 51.

The MEA 52 chiefly includes a polymer electrolyte membrane 53 of a monovalent cation-exchange membrane, and an anode 54 and a cathode 55 both of which sandwich the polymer electrolyte membrane 53. The anode 54 is provided on the front side of the polymer electrolyte membrane 53, and the cathode 55 is provided on the back side thereof. The anode 54 and cathode 55 are mainly constituted of carbon paper and catalyst (Pt, Ru or the like) to cause electrode reaction on the polymer electrolyte membrane 53.

In a unit cell 51, the anode separator 61 is provided on the anode 54 side, and the cathode separator 62 is provided on the cathode 55 side. The anode separator 61 and the cathode separator 62 are of metal and conductive, whereby the plurality of unit cells 51 are serially connected with one another. The serially connected unit cells 51 have a positive terminal and a negative terminal (not shown in the drawing). The positive terminal is pulled out through a through hole 71c of the front plate 71 to the external, and the negative terminal is pulled out through a through hole 72c of the read plate 72 to the external.

(Hydrogen Flow Path in Fuel Cell Stack)

Descriptions will be given on the fuel cell stack 50 with reference to FIGS. 1 to 3.

In the stacking direction of the fuel cell vehicle 200, that is, the stacking direction of the unit cells 51, there is provided a communication hole for hydrogen supply 50a for supplying hydrogen for each unit cell 51 on the upper left side of the fuel cell stack 50, viewed from the front side to the rear side of the vehicle 200. The communication hole for hydrogen supply 50a is constituted of communication holes formed on each anode separator 61, polymer electrolyte membrane 53 and cathode separator 62, which are stacked.

There are provided on the lower right side of the fuel cell stack 50, viewed from the front side to the rear side of the vehicle 200, a communication hole for hydrogen discharge 50b serving for discharging un-reacted hydrogen and the like that has been discharged from each unit cell 51 to the external.

A groove-like hydrogen flow path 61a is formed on the back face (face on the anode 54 side) of the anode separator 61 of each unit cell 51 for the purpose of supplying the hydrogen all through the face of the anode 54.

The hydrogen flows from the communication hole for hydrogen supply 50a into the hydrogen flow path 61a of each unit cell 51, is supplied for each anode 54, and then un-reacted hydrogen is discharged through the communication hole for hydrogen discharge 50b to the external.

(Air Flow Path in Fuel Cell Stack)

Descriptions will be provided on an air flow path within the fuel cell stack 50 with reference to FIGS. 1 to 3.

There are provided on the upper right side of the fuel cell stack 50, viewed from the front side to the rear side of the vehicle 200, a communication hole for air supply 50c serving for supplying the air including humidified oxygen from the humidifier 103 to each unit cell 51. There are provided, on the lower left side of the fuel cell stack 50, a communication hole for air discharge 50b serving for discharging the air and the like that has been discharged from each unit cell 51 to the external.

A groove-like air flow path 61a is formed on the front face (on the cathode 55 side) of the cathode separator 62 of each unit cell 51 for the purpose of supplying the air all through the face of the cathode 55.

The air flows from the communication hole for air supply 50c into the air flow path 62a of each unit cell 51 so as to supply the air for each cathode 55, and then un-reacted oxygen is discharged through the communication hole for air discharge 50d to the external.

(Coolant Flow Pass in Fuel Cell Stack)

Description will be provided on a coolant flow pass in the fuel cell stack 50 with reference to FIGS. 1 to 4.

In the stacking direction of the unit cells 51 (the longitudinal direction of the vehicle 200), there are provided four communication holes for coolant supply 50e for supplying coolant that is supplied via a coolant manifold 1 to each unit cell 51, on the left side of the fuel cell stack 50 viewed from the front side to the rear side of the vehicle 200.

There are provided, on the right side of the fuel cell stack 50, four communication holes for coolant discharge 50f serving for discharging to the coolant manifold 1 the coolant that has been discharged from each unit cell 51.

A groove-like coolant flow path 62b is formed on the front face of the cathode separator 62 of each unit cell 51 (see FIG. 4), where the coolant circulates.

The coolant flows from the four communication holes for coolant supply 50e into the coolant flow path 62b of each unit cell 51 so as to cool each unit cell 51, and then is discharged through the four communication holes for coolant discharge 50f to the external.

Figure 4:
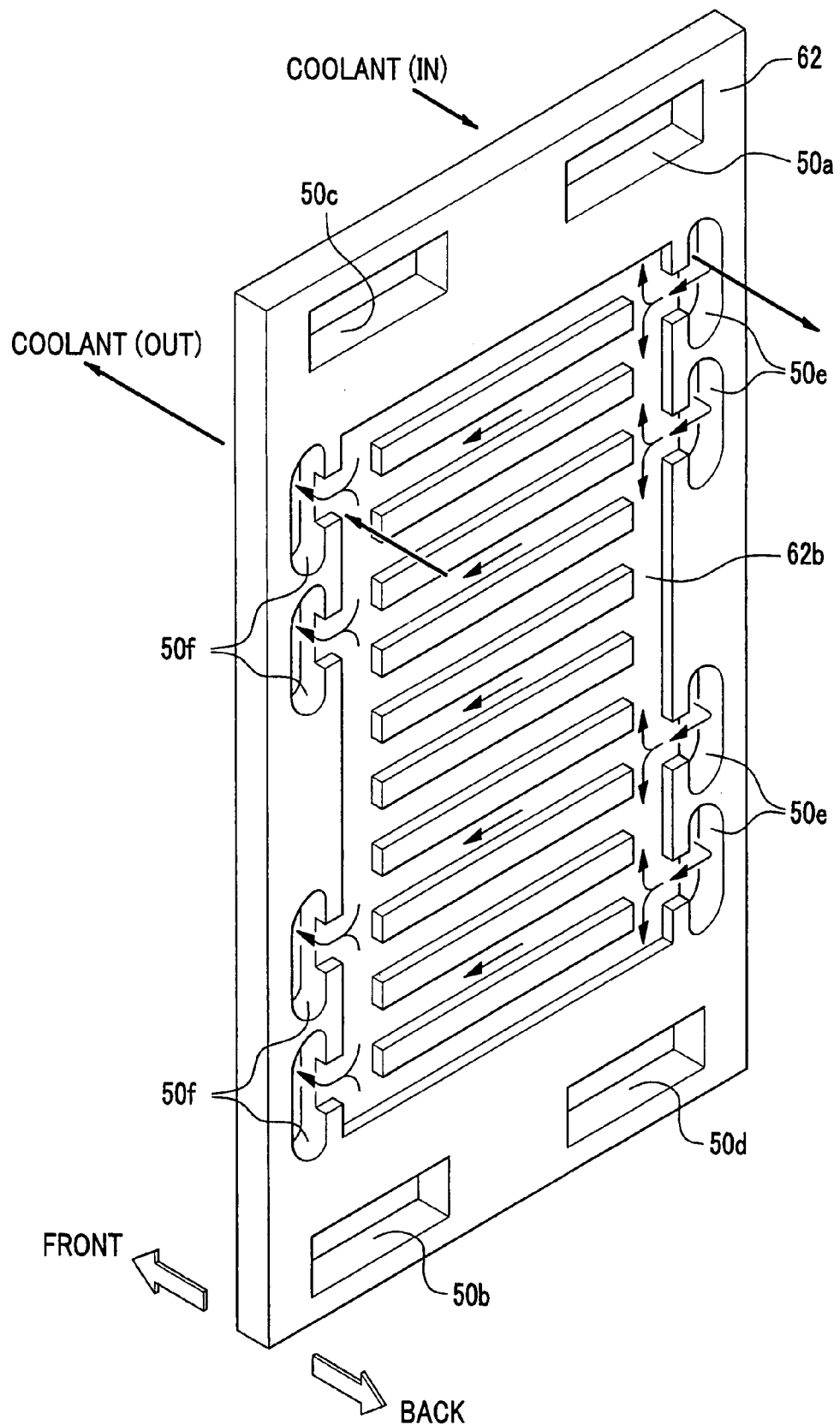
FIG. 4 is a perspective view of a cathode separator viewed from backward.

More specifically, the four communication holes for coolant supply 50e and the four communication holes for coolant discharge 50f are provided respectively on each side of the fuel cell stack 50 in the front elevational view, viewed from the front side to the rear side of the vehicle 200. The four communication holes for coolant supply 50e and the four communication holes for coolant discharge 50f are arranged in a row in the perpendicular direction, respectively on each side of the fuel cell stack 50, as shown in FIG. 4. This means that each arrangement direction of the four communication holes for coolant supply 50e and of four communication holes for coolant discharge 50f is perpendicular.

The coolant is supplied via a coolant supply unit constituted of the four communication holes for coolant supply 50e to the coolant flow path 62b of each unit cell 51 and is discharged via a coolant discharge unit constituted of the four coolant discharge 50f, whereby the coolant is uniformly circulated all through each coolant flow path 62b to cool the entire of each unit cell 51, so as to prevent a partial temperature increase of the unit cell 51.

<Coolant Manifold>

Descriptions will be given on coolant manifolds 1, 1 that are installed to the fuel cell stack 50 as configured above.

Figure 5:
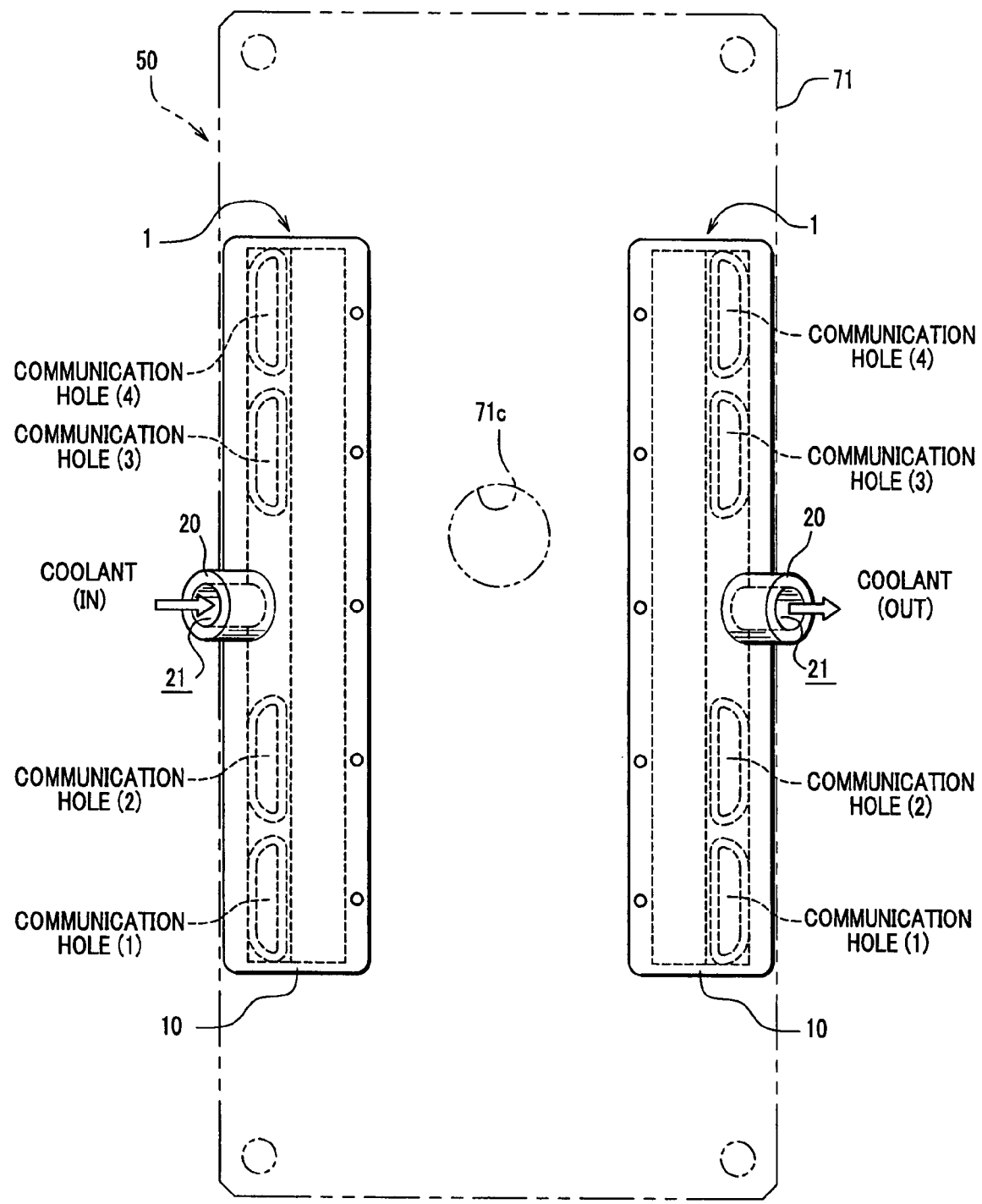
FIG. 5 is a front view of the fuel cell stack and a coolant manifold according to the first embodiment.

As shown in a front elevational view of the fuel cell stack 50 in FIG. 5, one coolant manifold 1 on the left side is a manifold for supplying the coolant, and the other coolant manifold 1 on the right side is a manifold for discharging the coolant. Specifically, in FIG. 5, the coolant manifold 1 on the left side serves for supplying and distributing the coolant supplied from the radiator 104 into the four communication holes for coolant supply 50e in the fuel cell stack 50. The coolant manifold 1 on the right side serves for collecting the coolant that has been discharged from the four communication holes for coolant discharge 50f in the fuel cell stack 50 into the radiator 104. The coolant manifold 1 on the coolant supply side and the coolant manifold 1 on the coolant discharge side are attached onto the front plate 71 symmetrically relative to the width direction of the vehicle 200 (right and left direction in FIG. 5).

Both coolant manifolds 1, 1 on the coolant supply side and on the coolant discharge side have the identical shape and structure, therefore, descriptions will be given chiefly on the coolant manifold 1 on the coolant supply side, hereinafter.

(Coolant Manifold on Coolant Supply Side)

With reference to FIGS. 5 to 8, the manifold 1 is integrally molded of synthetic resin and includes a cylindrical manifold body 10 of which both ends are closed, an external communication part 20 and four legs 30, 30, 30, 30.

[Manifold]

Figure 6:
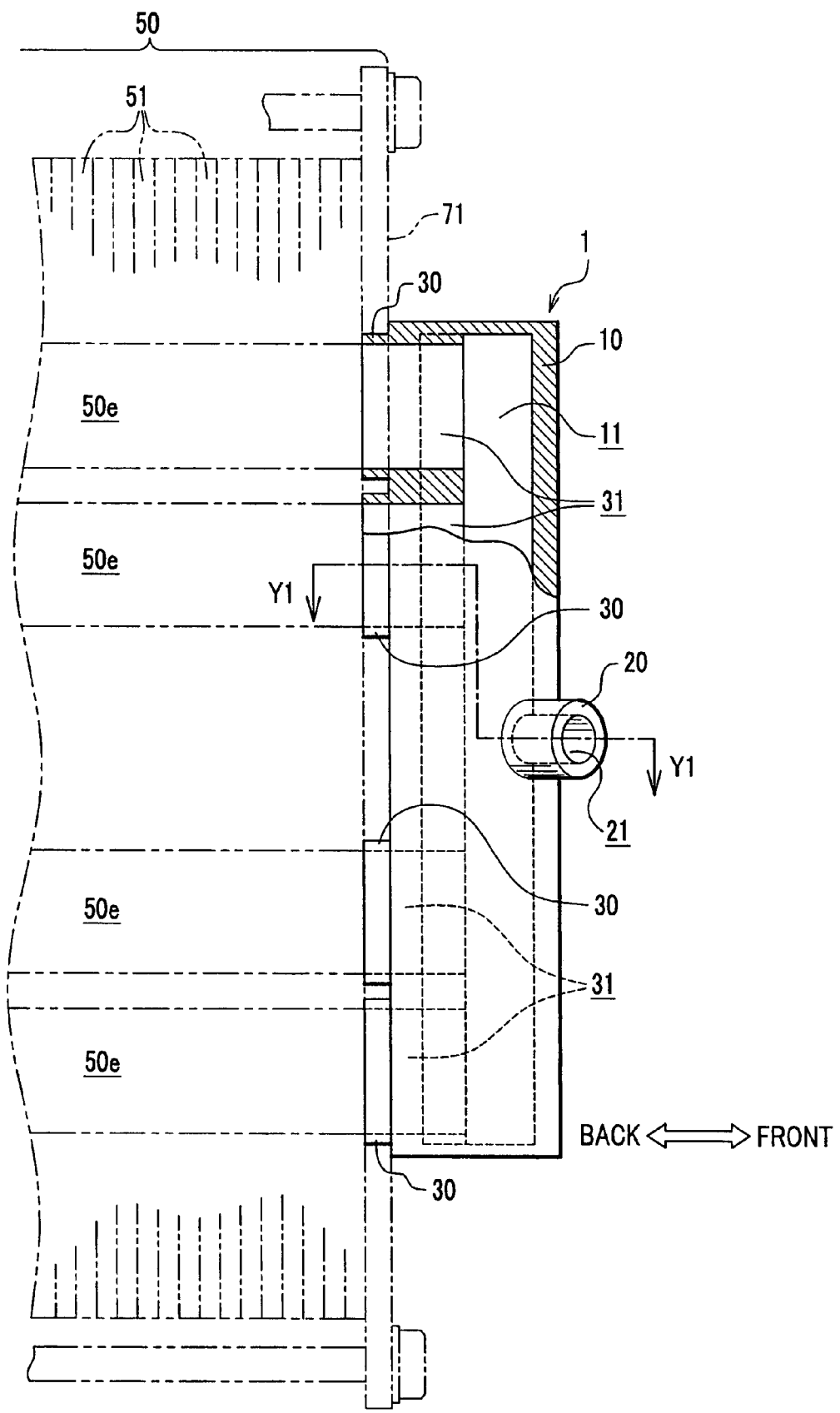
FIG. 6 is a view of the fuel cell stack and the coolant manifold according to the first embodiment, seen from a direction of an arrow "X1" in FIG. 2.
Figure 7:
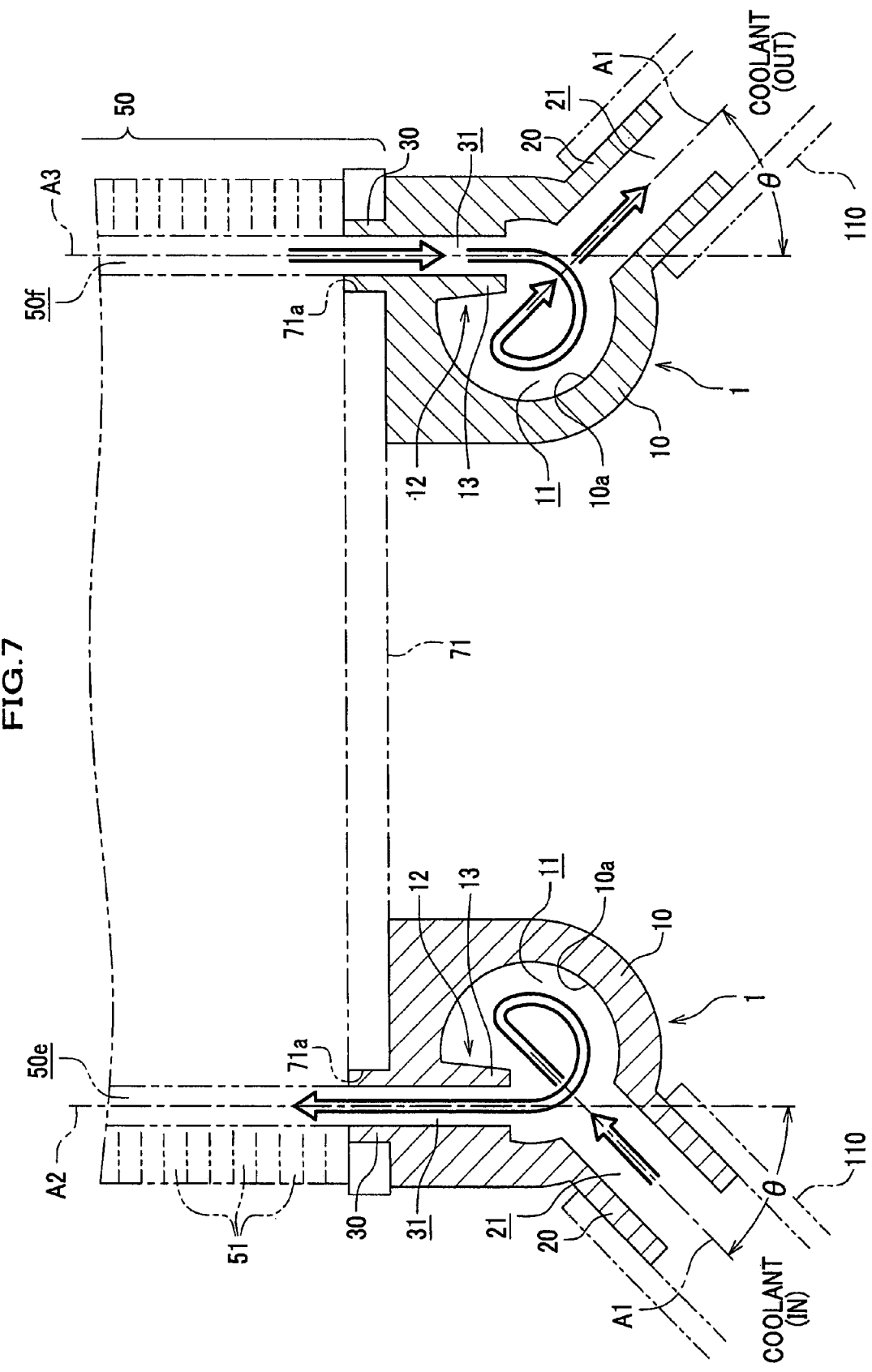
FIG. 7 is a sectional view of the coolant manifold according to the first embodiment, taken along a direction of arrows "Y1-Y1" of FIG. 6.

The manifold body 10 includes a manifold chamber 11 therewithin (see FIGS. 6 and 7). The manifold chamber 11 extends in a perpendicular direction in which four communication holes for coolant supply 50e are aligned (a right-angled direction to a paper face of FIG. 7), and is designed to be attached vertically to each of the four communication holes for coolant supply 50e when the coolant manifold 1 is installed to the fuel cell stack 50 (hereinafter only to only "in the installation state").

As shown in FIG. 7, on an inner circumferential wall 10a of the manifold body 10, there is provided a protruding portion 12 having a semi-circular shape with a central angle of an approximately 90° in a cross sectional view relative to the axial direction (perpendicular direction) thereof, and the protruding portion 12 is formed so as to protrude a center side thereof toward the manifold chamber 11. In other words, the manifold chamber 11 has a semi-circular shape with a central angle of an approximately 270° in a cross sectional view relative to the axial direction thereof. The protruding portion 12 is provided on the leg 30 side, a leg communication hole 31 (described later) of the leg 30 extends though the protruding portion 12 and open to the manifold chamber 11.

Since an embankment 13 (also referred to as "a rib") is projectedly provided on the inner circumferential wall 10a so as to constitute a part of the protruding portion 12 and form the leg communication hole 31, the embankment 13 serves as an impediment to impede the coolant supplied from the external communication hole 21 from flowing directly into each leg communication hole 31 through the manifold chamber 11.

"The coolant flows directly" means that the coolant supplied from the external communication hole 21 flows directly into the leg communication hole 31 without rushing against the inner circumferential wall 10a forming the manifold chamber 11 and with no significant change in flow.

Figure 8:
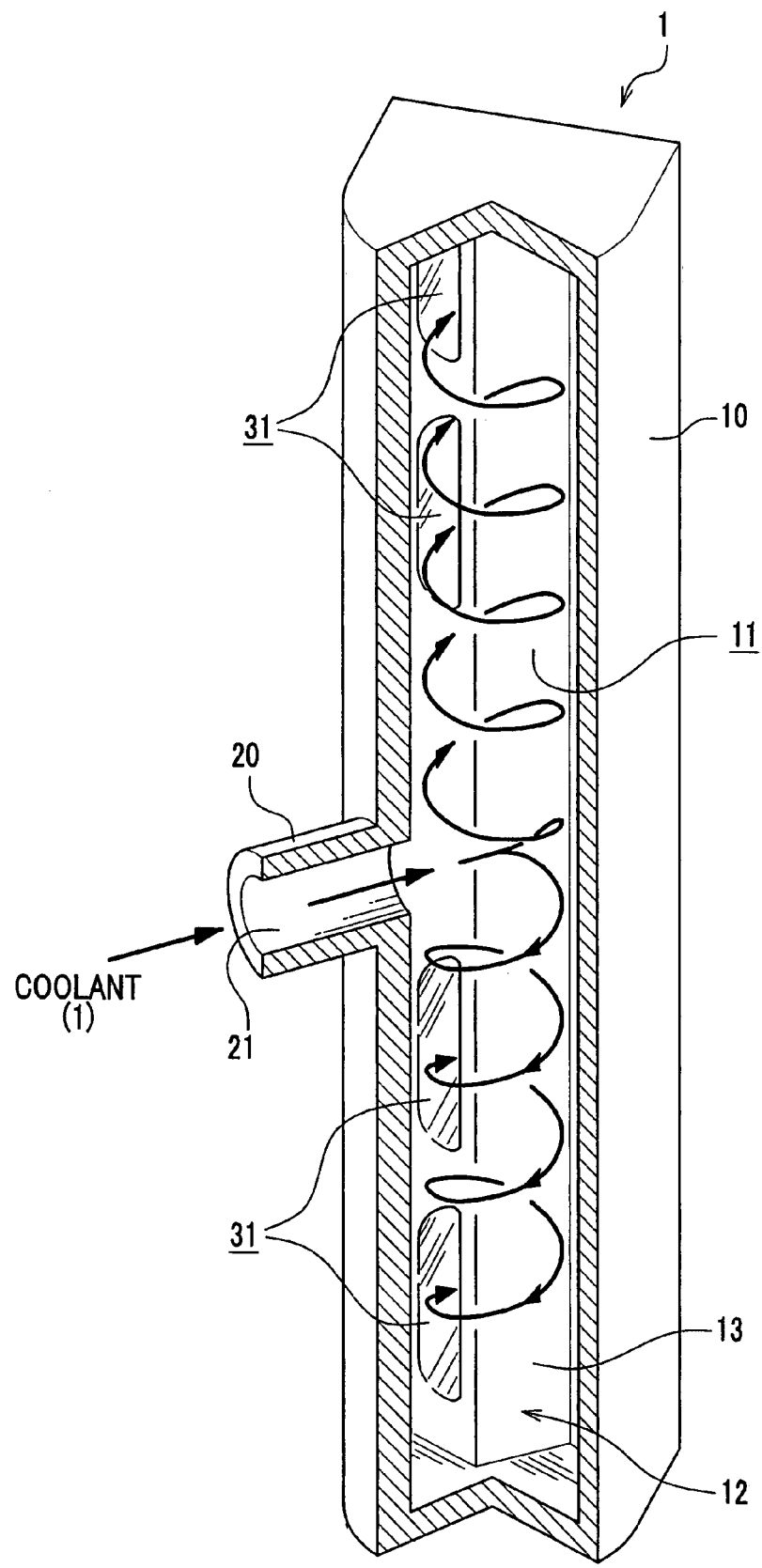
FIG. 8 is a perspective view of the coolant manifold according to the first embodiment.

The coolant supplied from the external communication hole 21 is impeded by the embankment 13 so that the coolant does not flow directly into each of the four leg communication holes 31, as shown in FIGS. 7 and 8. As a result, in the manifold chamber 11, disturbance and swirl occurs clockwise, in a cross sectional view of the perpendicular direction. Then, the disturbed and swirled coolant goes evenly into each leg communication hole 31.

It should be noted that the manifold body 10 is provided to be offset inward of the fuel cell stack 50 relative to the communication holes for coolant supply 50e (see FIGS. 5 and 7) without extending outward of the fuel cell stack 50 in the lateral direction thereof (lateral direction of the vehicle 200). Accordingly, it is possible to lay out the fuel cell stack 50 in the vehicle 200 easily with no dead space, even if the fuel cell stack 50 is provided with coolant manifold 1 as descried above.

In addition, as shown in FIGS. 5 and 7, the axis of the manifold chamber 11 is also offset inward of the fuel cell stack 50 relative to the communication holes for coolant supply 50e, whereby the coolant from the external communication holes 21 is impeded from flowing directly into the communication holes for coolant supply 50e.

[Legs]

Each of the four legs 30 is a part to be inserted into a corresponding one of four installation holes 71a provided in the front plate 71. Each leg 30 includes the leg communication hole 31 inside thereof. In the installation state, the manifold chamber 11 is communicated with the four communication holes for coolant supply 50e of the fuel cell stack 50 via the corresponding four leg communication holes 31.

The axis along the center of each leg communication holes 31 agrees with an axis A2 of the corresponding communication hole for coolant supply 50e.

[External Communication Part]

The external communication part 20 has a cylindrical shape and serves as a part over which a hose 110 or the like is fitted, which is connected with the radiator 104 (see FIG. 7). The external communication part 20 includes the external communication hole 21 insides thereof. When the radiator 104 and the external communication part 20 are connected with each other via the hose 110 or the like as described above, the radiator 104 and the manifold chamber 11 are also connected with each other via the external communication part 21.

The axis A1 along the center of the external communication hole 21 is designed to be provided unparallel and non-vertical to the axis A2 of each communication hole for coolant supply 50e in the fuel cell stack 50, that is, the axis A1 is in a positional relation to cross the axis A2 at a non-right angle. Hence, the coolant from the external communication hole 21 is impeded from flowing directly into the leg communication holes via the manifold chamber 11, and the swirling flow of the coolant occurs in the manifold chamber 11 at the same time.

As described above, it is designed that the inner circumferential wall 10a is placed on the axis A1 of the external communication hole 21, so that the coolant from the external communication hole 21 into the manifold chamber 11 rushes against the inner circumferential wall 10a on the axis A1, whereby the disturbance or swirl of the coolant is caused so as to prevent the coolant from flowing directly into the four leg communication holes 31.

The axis A1 of the external communication hole 21 (the external communication part 20) is disposed from a position of any of the four communication holes for coolant supply 50e in the alignment direction thereof (perpendicular direction), and is provided at a middle position of the alignment of the communication holes for coolant supply 50e, so that the coolant is disturbed to the four communication holes for coolant supply 50e (FIGS. 5 and 6). In other words, the external communication hole 21 is provided at the middle between the two outermost communication holes for coolant supply 50e (communication holes (1) and (4) of FIG. 5) in the alignment direction (perpendicular direction) of the four communication holes for coolant supply 50e.

The external communication part 20 is provided opposite the fuel cell stack 50 across the manifold chamber 11, and extends outward of the fuel cell stack 50. Accordingly, it is easy to fit the hose 110 over the external communication part 20.

The axis A1 of the external communication hole 21 is designed, for example, such that an angle θ defined between the axis A2 of each communication hole for coolant supply 50e and the axis A1 falls within a range of 10° to 70° on a right-angled plane (i.e. an horizontal plane in the first embodiment) with respect to both a front face of the front plate 71 and a virtual plane along the alignment direction of the four communication holes for coolant supply 50e (see FIG. 7).

(Effects of Coolant Manifold on Supply Side)

The above described coolant manifold 1 on the supply side generally provides the following effects.

After the coolant supplied from the radiator 104 flows through the single external communication hole 21, the swirling flow of the coolant occurs in the manifold chamber 11 so that the coolant is impeded from flowing directly into the four leg communication holes 31. In addition, the embankment 13 also prevents the coolant from flowing directly into the leg communication holes 31.

Figure 9:
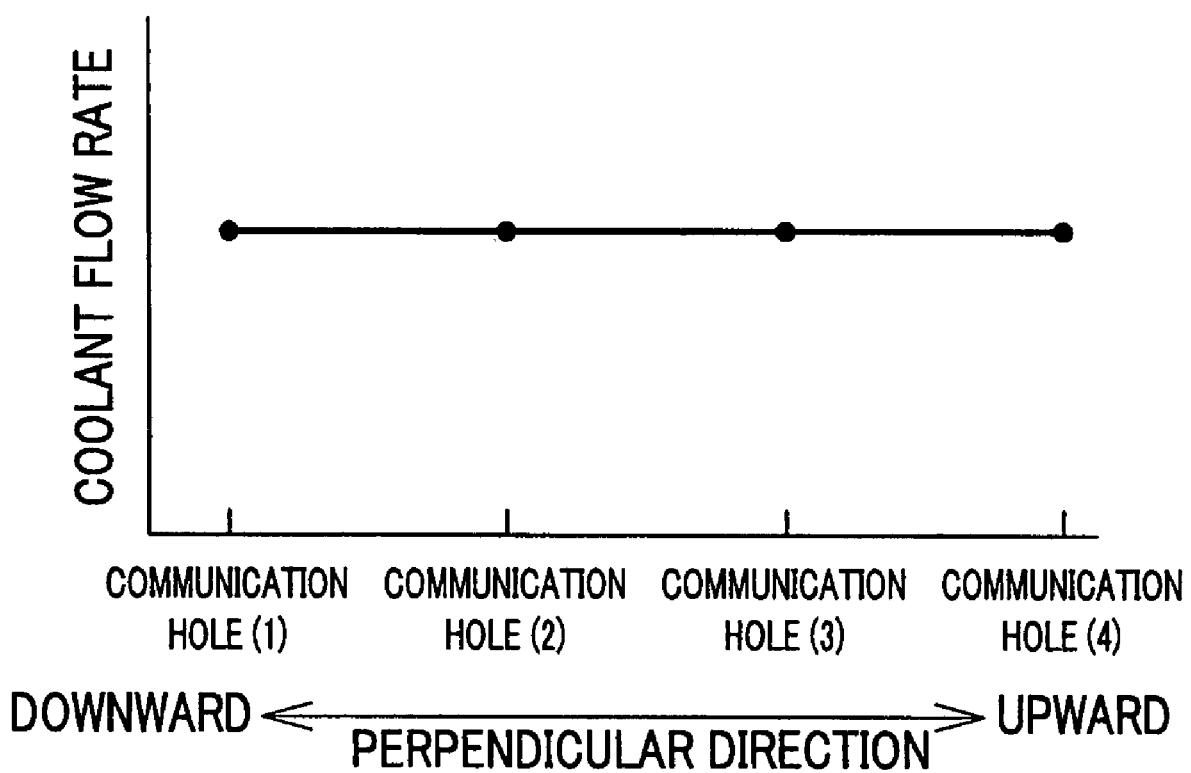
FIG. 9 is a graph showing an effect of the coolant manifold according to the first embodiment.

Then, the swirled coolant flows evenly into the four leg communication holes 31, whereby the coolant is distributed and circulated in the four communication holes for coolant supply 50e at the same flow rate (FIG. 9). Now, assumed that the communication holes in the perpendicular direction are communication holes 1, 2, 3 and 4, respectively, and FIG. 9 is a graph showing a comparison of flow rate of the coolant circulating through the communication holes (1) to (4).

As seen in a result of the comparison in FIG. 9, the coolant flows smoothly all through the coolant flow path 62b (see FIG. 4) of each cathode separator, so that each unit cell 51 can be cooled efficiently and evenly. Therefore, a local temperature rise is prevented in the fuel cell stack 50, and temperature distribution in the fuel cell stack 50 becomes even, resulting in easier temperature control.

Figure 10B:
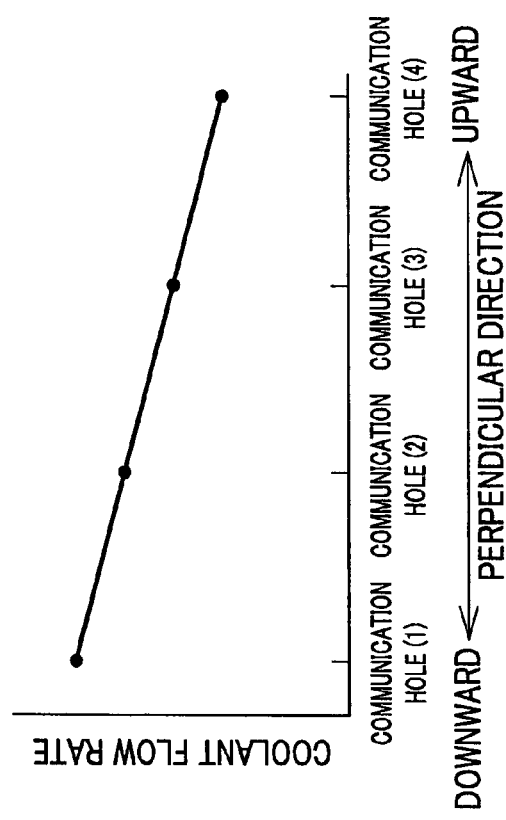
FIG. 10B is a graph showing coolant flow rate in this coolant manifold.
Figure 10A:
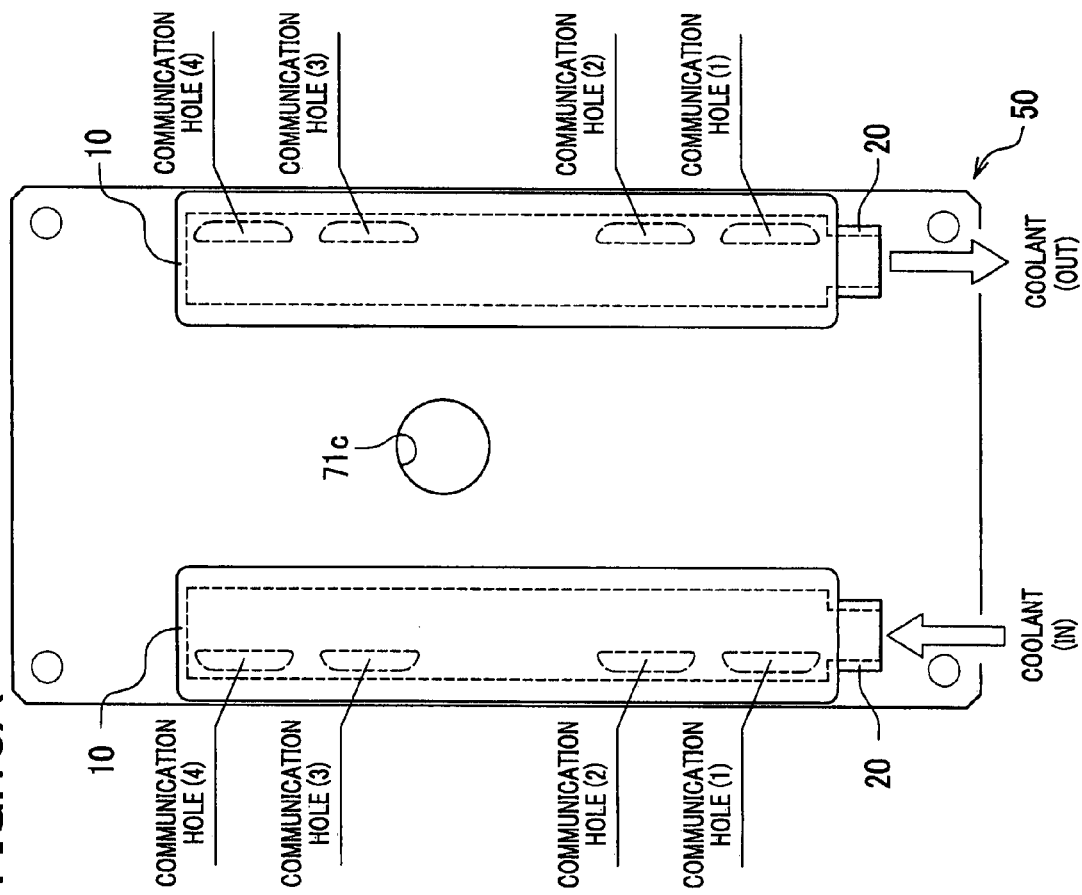
FIG. 10A is a front view of a coolant manifold according to a comparative example 1.

To the contrary, as is in a comparative example 1 of FIG. 10A, if the external communication part 20 is provided at a lower end of the manifold body 10 in the perpendicular direction thereof, the positional relation between the axis A1 of the external communication hole 21 and the axis A2 of each four communication hole for coolant supply 50e in the fuel cell stack 50 becomes vertical (θ=90°), so that there occurs no swirling flow of the coolant. As shown in FIG. 10B, the flow rate becomes the greatest in the communication hole 1 nearest to the external communication part 20 and becomes smaller in the communication holes as they are apart from the external part 20 (the flow rate becomes smaller in the order of the communication holes (2), (3), (4) of FIG. 10B).

Therefore, the coolant does not flow smoothly all through the coolant flow path 62b of each cathode separator 62 (see FIG. 4). Consequently, temperature is likely to increase locally in each unit cell 51, so that it would become difficult to control the temperature without using plural temperature sensors in the fuel cell stack 50.

Figure 11B:
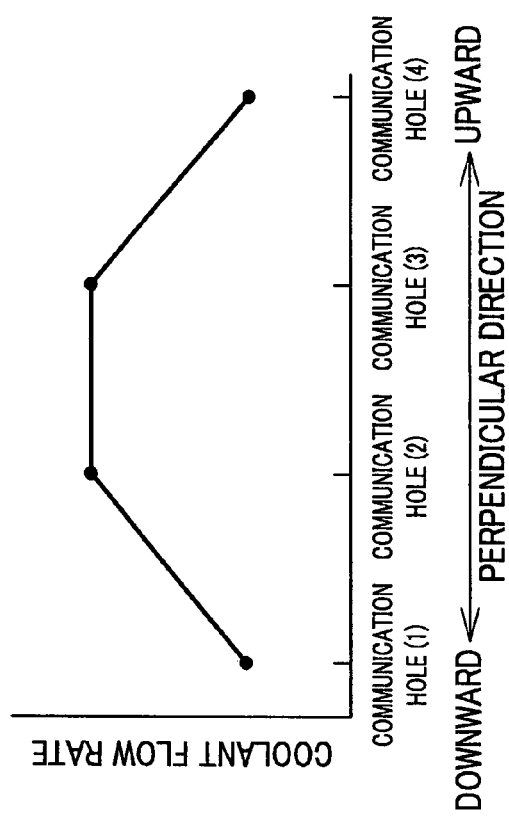
FIG. 11B is a graph showing coolant flow rate in this coolant manifold.
Figure 11A:
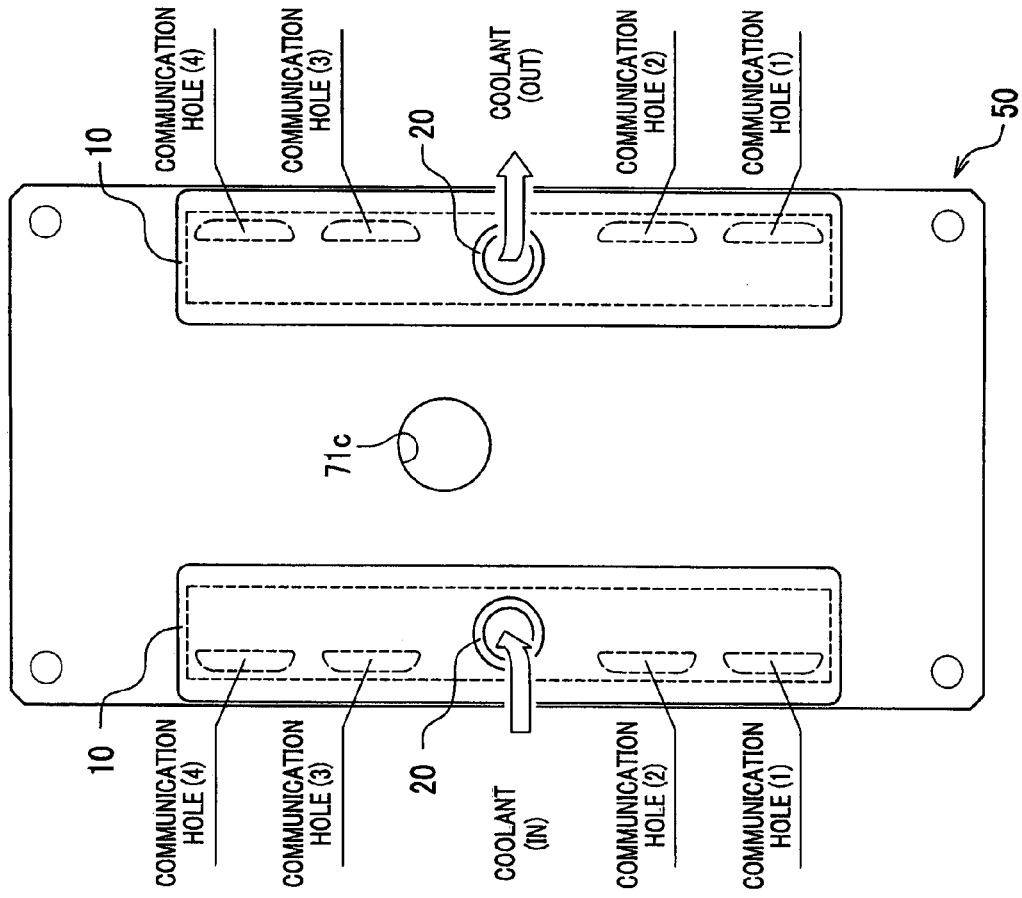
FIG. 11A is a front view of a coolant manifold according to a comparative example 2.

In addition, as is in a comparative example 2 of FIG. 11A, if the external communication part 20 is provided at a front end of the manifold body 10 in the right-angled direction thereof, the positional relation between the axis A1 of the external communication hole 21 and the axis A2 of each four communication hole for coolant supply 50e in the fuel cell stack 50 becomes parallel (θ=0°), so that there also occurs no swirling flow of the coolant. As shown in a graph of FIG. 11B, the flow rate becomes the greatest in the communication holes (2) and (3) nearest to the external communication part 20 and becomes smaller in the communication holes (1) and (4) far from the external communication part 20.

(Coolant Manifold on Discharge Side)

As shown in FIGS. 5 and 7, the coolant manifold 1 provided on the discharge side, that is, on the right side viewed from the front side to the rear side of the vehicle 200, brings the same effects as those by the coolant manifold 1 on the right supply side although it has a reverse flow of the coolant compared to the coolant manifold 1 on the left discharge side.

As shown in FIG. 7, since the axis A3 along each center of the four communication holes for coolant discharge 50f and the axis A1 of the external communication hole 21 are in an unparallel and non-vertical relation, specifically, the axis A1 is in a positional relation to cross the axis A3 at an non-right angle, the coolant discharged from the four communication holes for coolant discharge 50f via the four leg communication holes 31 in the legs 30 into the manifold chamber 11 is caused to be swirled in the manifold chamber 11. As a result, the coolant is impeded from flowing from the leg communication hole 31 directly into the external communication hole 21.

Accordingly, the flow rate of the coolant from each leg communication hole 31 into the manifold chamber 11 becomes approximately even, whereby the flow rate of the coolant from the coolant flow path 62c of each cathode separator 62 into the four communication holes for coolant discharge 50f becomes approximately even (see FIG. 4). Specifically, the coolant flows from all through the coolant flow path 62b into the four communication holes for coolant discharge 50f, so that the coolant having increased temperature due to the thermal exchange in each unit cell 51 is unlikely to remain behind in the coolant flow path 62b. Accordingly, the coolant smoothly circulates all through the coolant flow path 62b so that it is possible to provide cooling all through the unit cell 51 appropriately.

(Method for Producing Coolant Manifold)

Figure 12:
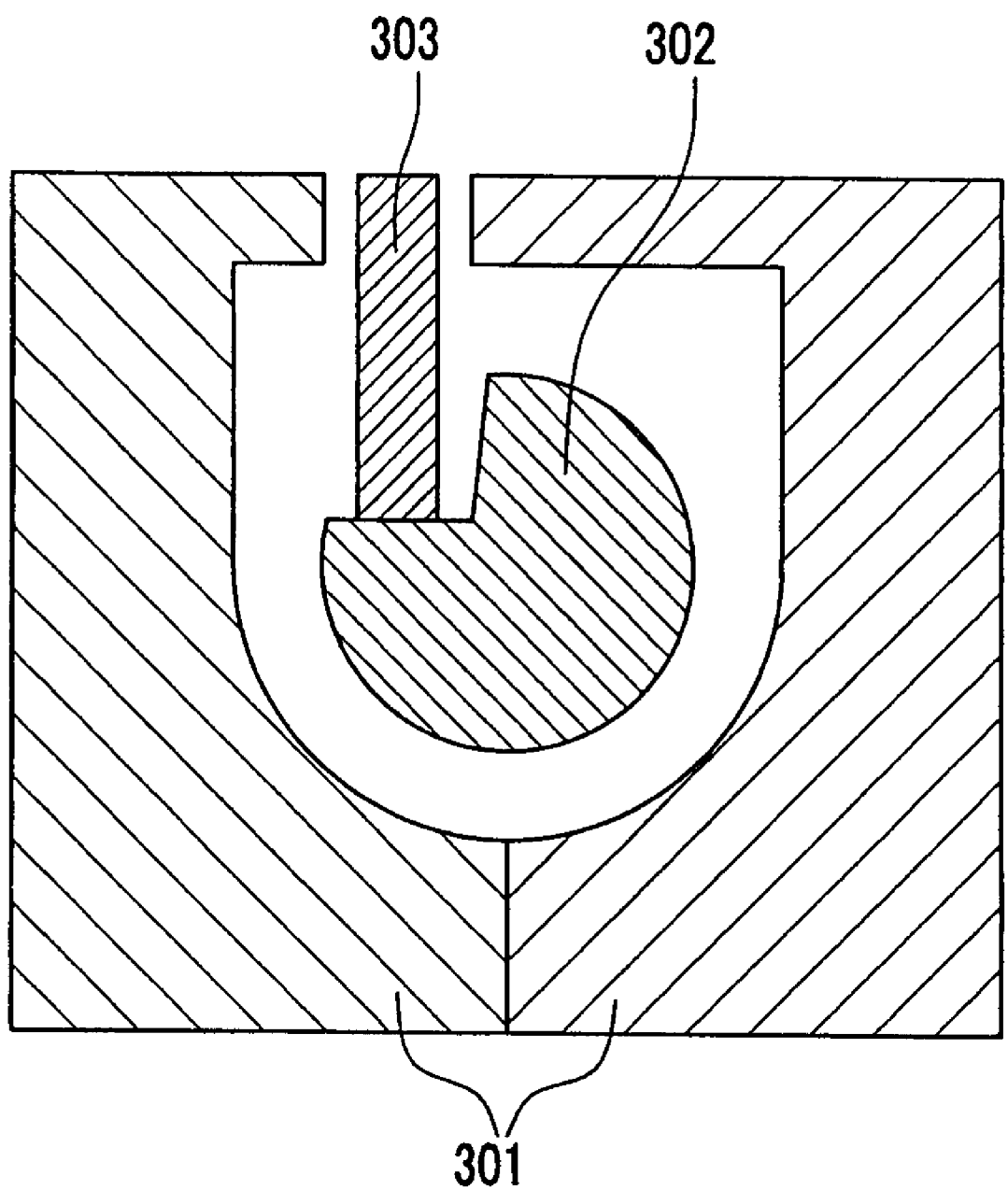
FIG. 12 is a cross-sectional view showing a method for producing the coolant manifold according to the first embodiment.

With reference to FIG. 12, a description will be provided on a method for producing the coolant manifold 1 on the supply side.

As shown in FIG. 12, there are provided a mold 301 and inner molds 302, 303, both of which are placed within the mold 301. The inner mold 302 serves for molding the manifold chamber 11, and the inner mold 303 serves for molding the leg communication hole 31 (See FIG. 7).

It should be noted that the inner molds 302 and 303 are jointed to each other on each flat face thereof, as shown in FIG. 12, which facilitates positioning of the inner mold 303 with respect to the inner mold 302, compared with a case of jointing them to each other on each curved face thereof. In this way, the manifold chamber 11 can be obtained, in which the manifold 11 and the leg communication holes 31 are formed at a precise position Second Embodiment Descriptions will be provided on the second embodiment of the present invention, with reference to FIGS. 13 and 14.

Figure 13:
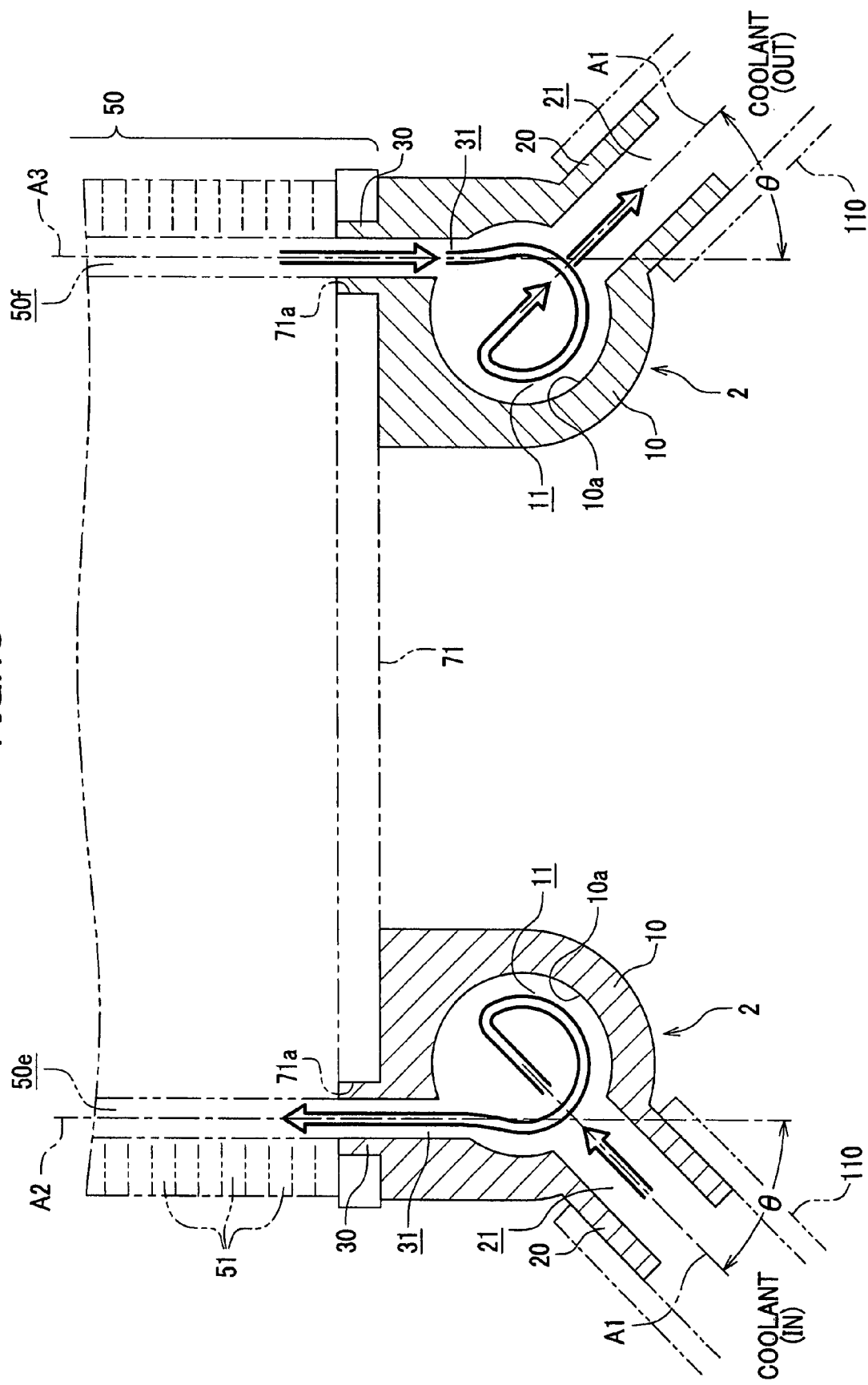
FIG. 13 is a cross-sectional view of a coolant manifold according to a second embodiment.
Figure 14:
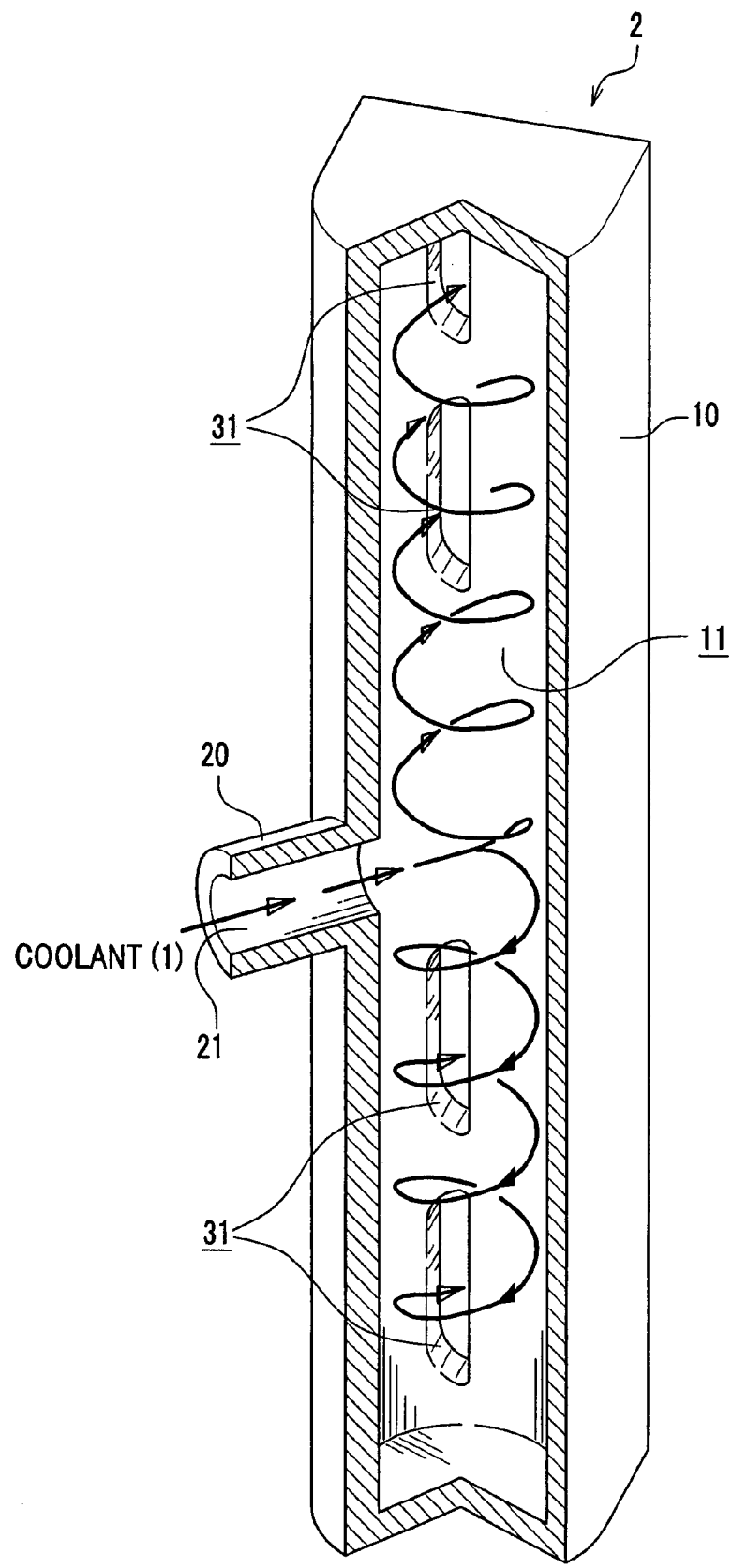
FIG. 14 is a perspective view showing the coolant manifold according to the second embodiment.

As shown in FIGS. 13 and 14, a coolant manifold 2 according to the second embodiment misses the protruding portion 12 and embankment 13 of the first embodiment (see FIGS. 7 and 8). As mentioned above, it may be preferable to provide the embankment 13 of the first embodiment, so as to impede the coolant flow between the external communication hole 21 and the leg communication holes 31.

Third Embodiment

There will be provided descriptions on the third embodiment of the present invention hereinafter, with reference to FIGS. 15 to 18.

Figure 15:
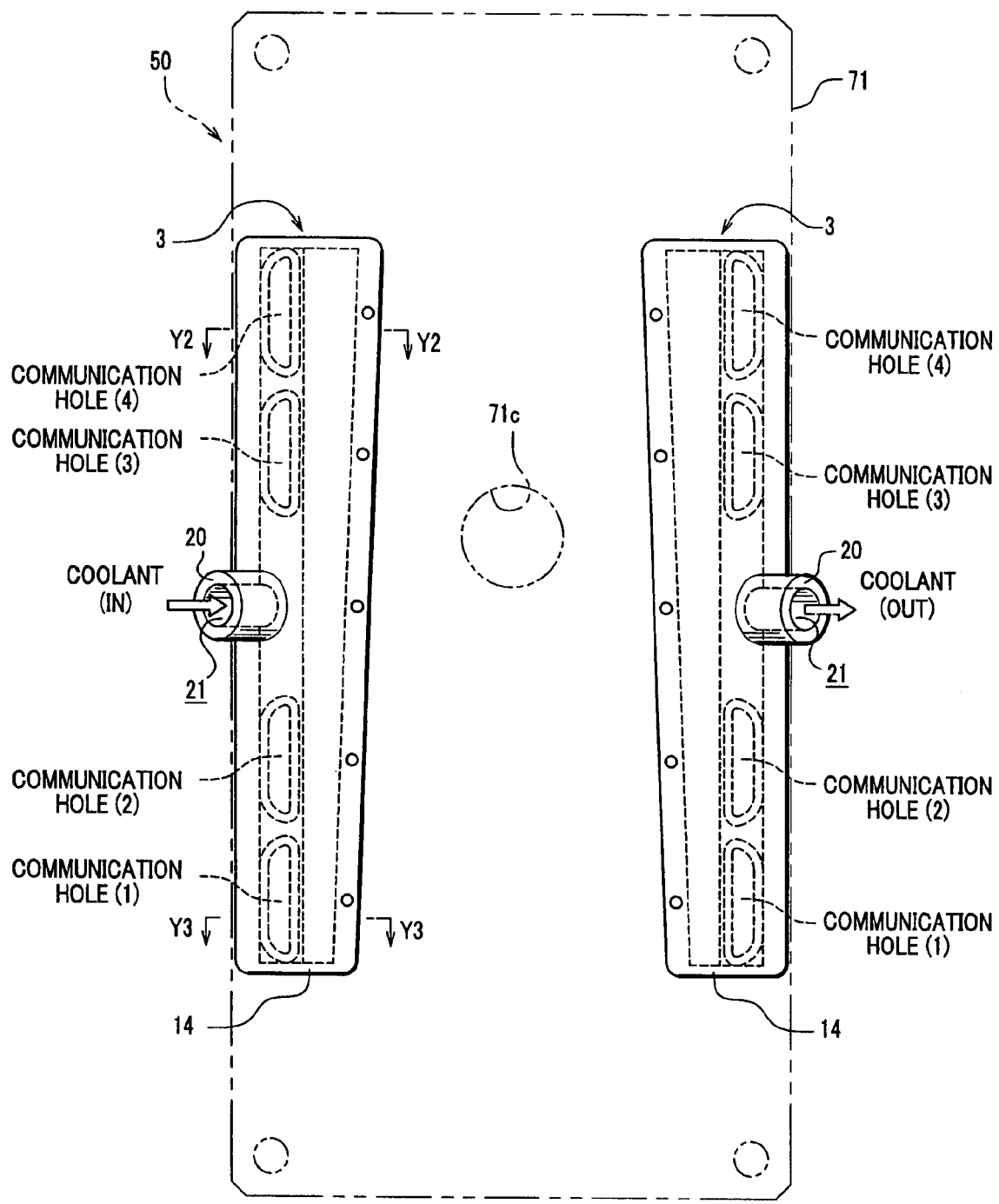
FIG. 15 is a front view of a fuel cell stack and a coolant manifold according to a third embodiment.
Figure 16:
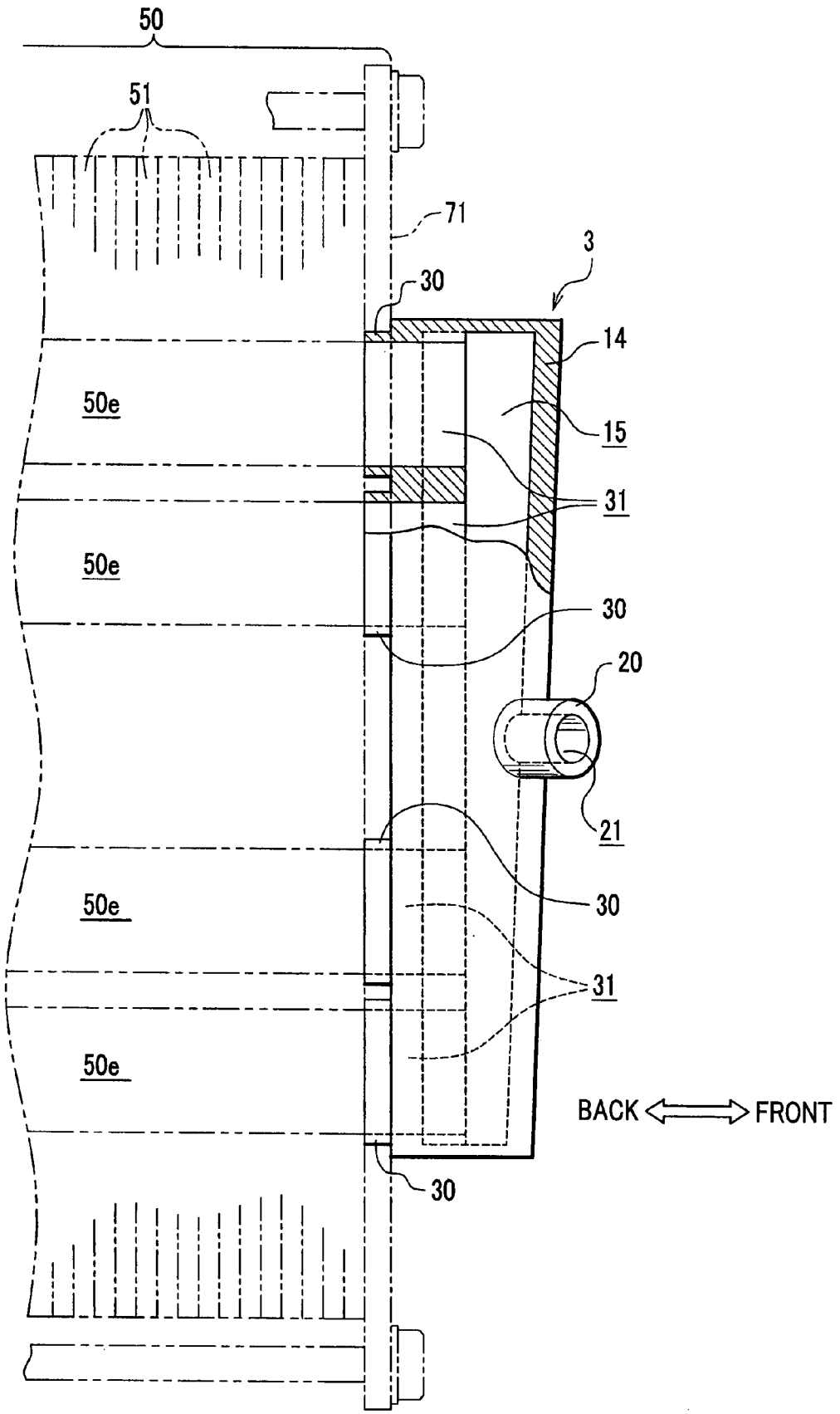
FIG. 16 is a view of the fuel cell stack and the coolant manifold according to the third embodiment, seen from the direction of the arrow "X1" of FIG. 2.
Figure 17A:
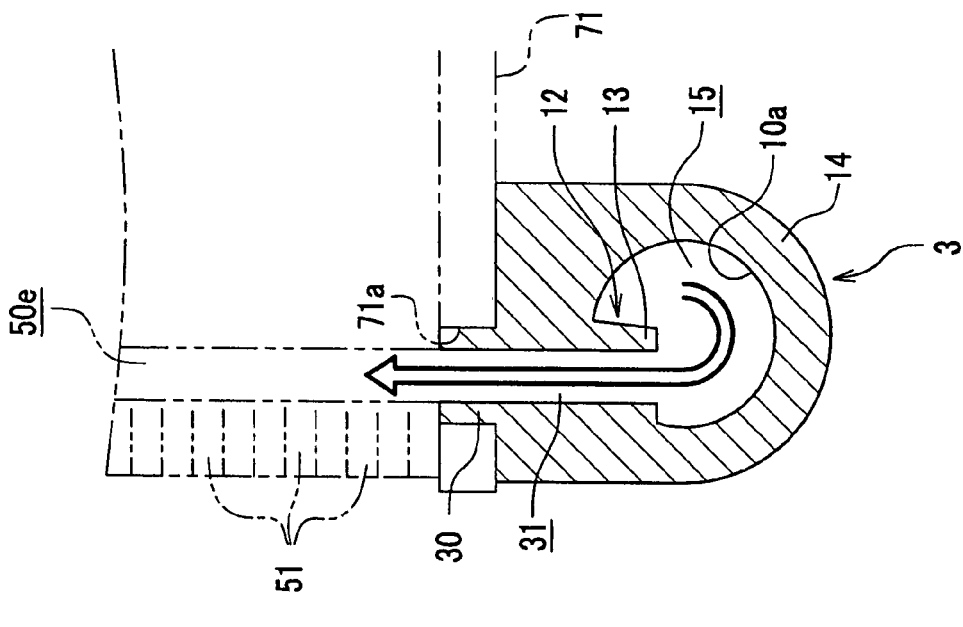
FIG. 17A is a sectional view of the coolant manifold according to the third embodiment, taken along a direction of arrows "Y2-Y2" of FIG. 15.
Figure 17B:
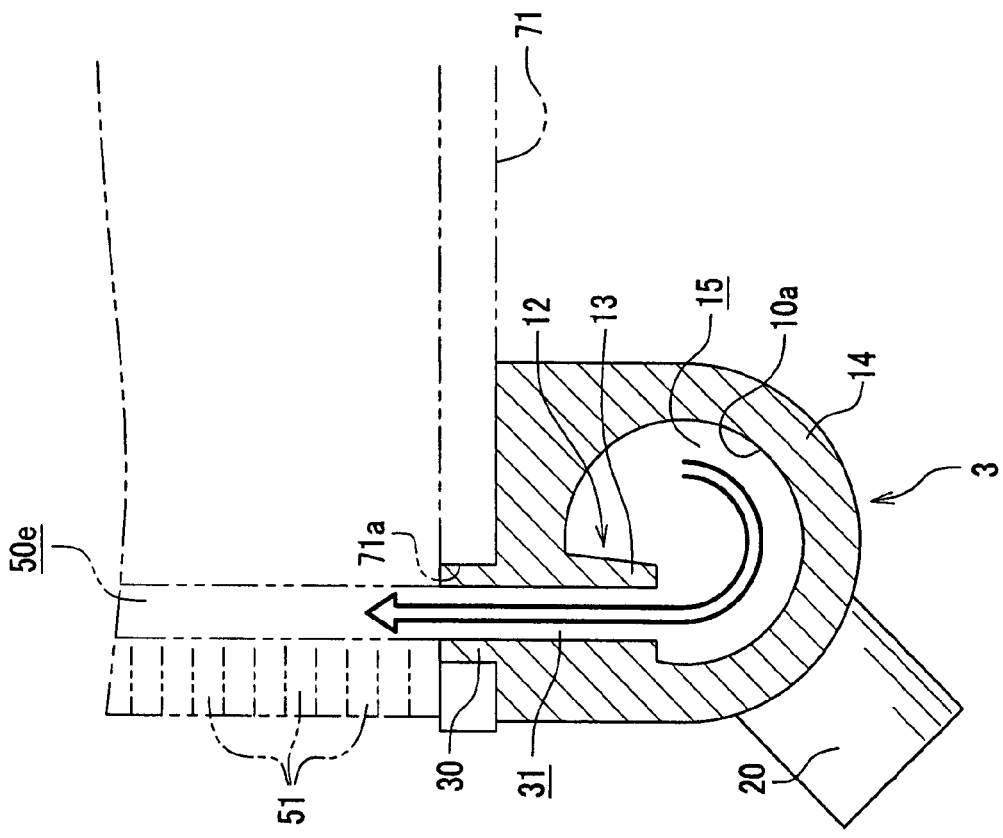
FIG. 17B is a sectional view thereof, taken along a direction of arrows "Y3-Y3" of FIG. 15.

As shown in FIGS. 15 to 17, manifold bodies 14, 14 of coolant manifolds 3, 3 according to the third embodiment have an outer shape which becomes narrower as it goes downward in the perpendicular direction thereof. A manifold chamber 15 formed in each coolant manifold 3 also becomes narrower (smaller) as it goes downward in the perpendicular direction thereof.

In the coolant manifold 3 as structured above, although the coolant on the supply side is affected by the gravity and it tends to flow downward of the manifold chamber 15 from the external communication hole 21 at the middle of the manifold body 14, the manifold chamber 15 is structured to be gradually narrower in the perpendicular direction, which enhances the coolant to flow in all through the manifold chamber 15. Accordingly, it is possible to evenly distribute the coolant through the four leg communication holes 31 to the four communication holes for coolant supply 50e.

On the other hand, on the coolant discharge side, since the manifold chamber 15 on the discharge side is gradually narrower toward the perpendicularly lower end, the coolant affected by the gravity is impeded from flowing into the manifold chamber 15 from the communication holes for coolant discharge 50f on the lower side. Consequently, the coolant is also impeded from being supplied into the communication holes for coolant discharge 50f on the lower side from the coolant supply side. Even though the coolant affected by the gravity tends to flow into the communication holes for coolant discharge 50f on the lower side, the coolant is impeded from being supplied thereto. Accordingly, it is possible to distribute the coolant evenly to the four communication holes for coolant supply 50e.

Although FIG. 15 exemplifies that the manifold bodies 14, 14 on both supply and discharge sides have the chamber 15 of the third embodiment which is gradually narrower toward perpendicularly lower end, only one manifold body 14 on either the supply or discharge sides may have such a manifold chamber 15.

Figure 18:
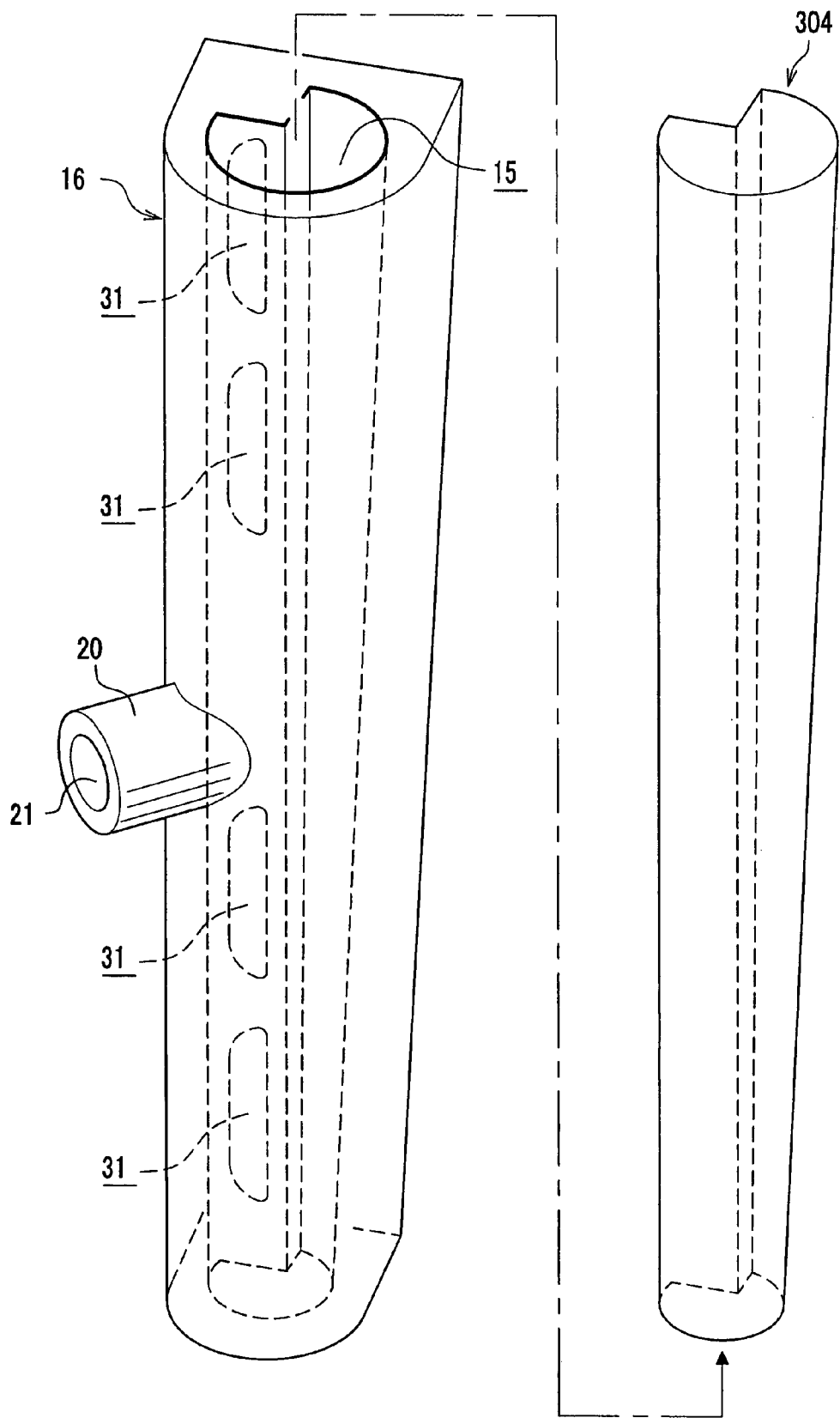
FIG. 18 is a perspective view showing a producing process of the coolant manifold according to the third embodiment.

As shown in FIG. 18, the inner mold 304 serving to form the above described manifold chamber 15 is designed to have a tapered outer circumferential face that is gradually narrower downward. Such an inner mold having this tapered outer circumferential face can be easily removed from the a cylindrical body 16 serving as a body of the manifold body 14 in the producing process of the coolant manifold 3, whereby the coolant manifold 3 can be easily produced.

Although the preferred embodiments of the present invention have been explained as described above, the present invention is not limited thereto, and modifications and changes in the following examples, or example, may be applied without departing from the scope of the invention encompassed by the appended claims.

According to the above described embodiments, the fuel cell stack 50 provided with the coolant manifold 1, 1 includes the four communication holes for coolant supply 50e and the four communication holes for coolant discharge 50f. However the present invention is not limited thereto, and there may be provided plural holes for either the communication holes for coolant supply 50e or the communication holes for coolant discharge 50f. The leg communication holes 31 of the legs

30 of the coolant manifold 1 may be provided by the corresponding number of the communication holes for coolant supply 50e or the communication holes for coolant discharge 50f.

According to the above described embodiments, the manifold chamber 11 has a cylindrical figure partially cutoff in a vertical relation with respect to the communication holes for coolant supply 50e and the communication holes for coolant discharge 50f in the fuel cell stack 50. However the manifold chamber 11 according to the embodiments of the present invention is not limited to such a positional relation or figure as far as the coolant can be distributed and collected evenly.

According to the above described embodiments of the present invention, it has been exemplified that the external communication part 20 and the external communication hole 21 include a single hole, respectively. However, the present invention is not limited thereto, and they are constituted of more than one.

As explained above in details, the present invention provides a coolant manifold capable of efficiently cooling a fuel cell stack by installing this coolant manifold to the fuel cell stack, and a method for supplying and discharging coolant using this coolant manifold.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A coolant manifold that is installed on a fuel cell stack so as to distribute coolant through the fuel cell stack, which is constituted by a plurality of unit cells stacked in a stacking direction and has more than one communication hole for coolant supply and at least one communication hole for coolant discharge, in which the coolant flows in an order from the communication holes for coolant supply through a plurality of the unit cells to the communication hole for coolant discharge, the coolant manifold distributing the coolant into the communication holes for coolant supply, the coolant manifold comprising:
 a manifold body having a manifold chamber that extends along an alignment direction of the communication holes for coolant supply, wherein the manifold body and the manifold chamber extend in a direction perpendicular to the stacking direction; and
 an external communication part having an external communication hole for communicating the manifold chamber with a component external to the fuel cell stack, and
 a center axis of the external communication hole being disposed in a non-horizontal and non-vertical position relative to a center axis of each communication hole for coolant supply.

2. A coolant manifold that is installed on a fuel cell stack so as to collect coolant through the fuel cell stack, which is constituted by a plurality of unit cells stacked in a stacking direction and has at least one communication hole for coolant supply and more than one communication hole for coolant discharge, in which the coolant flows in an order from the communication holes for coolant supply through a plurality of the unit cells to the communication hole for coolant discharge, the coolant manifold collecting the coolant flowing from the communication holes for coolant discharge, the coolant manifold comprising:
 a manifold body having a manifold chamber that extends along an alignment direction of the communication holes for coolant discharge, wherein the manifold body and the manifold chamber extend along a direction perpendicular to the stacking direction; and
 an external communication part having an external communication hole for communicating the manifold chamber with external, and
 a center axis of the external communication hole being placed unparallel and non-vertical relative to a center axis of each communication hole for coolant discharge.

3. The coolant manifold according to claim 1, further comprising
 a rib protrudingly provided on an inner circumferential wall that forms the manifold chamber, so as to impede the coolant from flowing directly between the external communication hole and the communication holes provided in the fuel cell stack.

4. The coolant manifold according to claim 2, further comprising
 a rib protrudingly provided on an inner circumferential wall that forms the manifold chamber, so as to impede the coolant from flowing directly between the external communication hole and the communication holes provided in the fuel cell stack.

5. The coolant manifold according to claim 1, wherein a position of the external communication hole is disposed apart from that of any of the communication holes in the fuel cell stack in the alignment direction thereof.

6. The coolant manifold according to claim 2, wherein a position of the external communication hole is disposed apart from that of any of the communication holes in the fuel cell stack in the alignment direction thereof.

7. The coolant manifold according to claim 3, wherein a position of the external communication hole is disposed apart from that of any of the communication holes in the fuel cell stack in the alignment direction thereof.

8. The coolant manifold according to claim 4, wherein the external communication hole is provided in the middle between two outer most communication holes.

9. The coolant manifold according to claim 1, wherein the external communication part is provided opposite the fuel cell stack across the manifold chamber and extends outward of the fuel cell stack.

10. The coolant manifold according to claim 2, wherein the external communication part is provided opposite the fuel cell stack across the manifold chamber and extends outward of the fuel cell stack.

11. The coolant manifold according to claim 3, wherein the external communication part is provided opposite the fuel cell stack across the manifold chamber and extends outward of the fuel cell stack.

12. The coolant manifold according to claim 1, wherein the communication holes provided in the fuel cell stack are aligned in a direction perpendicular to the stacking direction, and
the manifold chamber gradually becomes narrower toward a lower end thereof.

13. The coolant manifold according to claim 2, wherein the communication holes provided in the fuel cell stack are aligned in a direction perpendicular to the stacking direction, and the manifold chamber gradually becomes narrower toward a lower end thereof.

14. The coolant manifold according to claim 3, wherein
the communication holes provided in the fuel cell stack are aligned in a direction perpendicular to the stacking direction, and
the manifold chamber gradually becomes narrower toward a lower end thereof.

15. The coolant manifold according to claim 1, wherein the manifold body is offset inward of the fuel cell stack.

16. The coolant manifold according to claim 2, wherein the manifold body is offset inward of the fuel cell stack.

17. The coolant manifold according to claim 3, wherein the manifold body is offset inward of the fuel cell stack.

* * * * *